United States Patent
Blödt et al.

(10) Patent No.: US 12,000,786 B2
(45) Date of Patent: Jun. 4, 2024

(54) MEASURING DEVICE

(71) Applicant: Endress+Hauser SE+Co. KG, Maulburg (DE)

(72) Inventors: Thomas Blödt, Steinen (DE); Stefan Pflüger, Munich (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 538 days.

(21) Appl. No.: 17/293,704

(22) PCT Filed: Oct. 31, 2019

(86) PCT No.: PCT/EP2019/079874
§ 371 (c)(1),
(2) Date: May 13, 2021

(87) PCT Pub. No.: WO2020/104166
PCT Pub. Date: May 28, 2020

(65) Prior Publication Data
US 2022/0003687 A1 Jan. 6, 2022

(30) Foreign Application Priority Data
Nov. 21, 2018 (DE) ...................... 10 2018 129 356.9

(51) Int. Cl.
*G01N 22/00* (2006.01)
(52) U.S. Cl.
CPC .................. *G01N 22/00* (2013.01)
(58) Field of Classification Search
CPC ...................................................... G01N 22/00
See application file for complete search history.

(56) References Cited

U.S. PATENT DOCUMENTS 3,600,676 A * 8/1971 Lugwig ................ G01N 27/223
324/668
5,585,732 A * 12/1996 Steele .................... G01N 27/24
73/304 C (Continued)

FOREIGN PATENT DOCUMENTS

CN 101896797 A 11/2010
CN 201751392 U 2/2011

(Continued)

OTHER PUBLICATIONS

DE 102016120231 A1 (Year: 2016).*
Devine, Peter, Radar level measurement—The user's guide, VEGA Controls, 2000, 154 pp.

*Primary Examiner* — Timothy A Brainard
*Assistant Examiner* — Helena H Seraydaryan
(74) *Attorney, Agent, or Firm* — Mark A. Logan; Endress+Hauser (USA) Holding, Inc.

(57) ABSTRACT

Disclosed is a measuring device for measuring a dielectric constant of filling material in a container. The measuring device includes: a signal generating unit designed to drive a transmitter electrode with an AC voltage such that the transmitter electrode emits a radar signal in the direction of the filling material; a receiver electrode arrangeable in the container to receive the radar signal following passage through the filling material; and an evaluation unit configured to ascertain an amplitude, a phase shift, and/or a signal propagation time between transmitter electrode and receiver electrode on the basis of the received radar signal and to determine the dielectric constant on the basis of the ascertained signal propagation time, phase shift, and/or the amplitude.

11 Claims, 3 Drawing Sheets

(56) References Cited

U.S. PATENT DOCUMENTS

| | | |
|---|---|---|
| 2003/0117150 A1 | 6/2003 | Noik et al. |
| 2003/0117321 A1 | 6/2003 | Furse et al. |
| 2013/0249569 A1 | 9/2013 | Saarenmaa et al. |
| 2016/0113113 A1 | 4/2016 | Sethumadhavan et al. |

FOREIGN PATENT DOCUMENTS

| | | | |
|---|---|---|---|
| CN | 203134984 U | 8/2013 | |
| DE | 10016315 A1 | 10/2001 | |
| DE | 10163195 A1 | 7/2003 | |
| DE | 202013102514 U1 | 6/2013 | |
| DE | 102015117205 A1 | 4/2017 | |
| DE | 102016120231 A1 | 4/2018 | |
| EP | 0236434 B1 * | 10/1995 | |
| EP | 1321565 A1 | 6/2003 | |
| JP | 2000028550 A | 1/2000 | |
| WO | WO-2013079250 A1 * | 6/2013 | ............. G01N 22/02 |

* cited by examiner

MEASURING DEVICE

CROSS-REFERENCE TO RELATED APPLICATIONS

The present application is related to and claims the priority benefit of German Patent Application No. 10 2018 129 356.9, filed on Nov. 21, 2018, and International Patent Application No. PCT/EP2019/079874, filed on Oct. 31, 2019, the entire contents of which are incorporated herein by reference.

TECHNICAL FIELD

The invention relates to a measuring device for determining the dielectric value of a bulk material located in a container.

BACKGROUND

In automation technology—especially in process automation technology—field devices serving to detect and/or modify process variables are frequently used. In order to detect process variables, sensors are used, which are, for example, used in fill-level measuring devices, limit level measuring devices, flow-rate measuring devices, pressure- and temperature-measuring devices, pH measuring devices, conductivity-measuring devices, or dielectric value measuring devices. They detect the corresponding process variables such as the fill level, limit level, flow rate, pressure, temperature, pH value, redox potential, conductivity, or the dielectric value. Within the scope of the invention, the term "container" also refers to containers that are not closed such as basins, lakes, or flowing bodies of water. A variety of such field devices is manufactured and marketed by the Endress+Hauser company.

The determination of the dielectric value (also known as "dielectric constant" or "relative permittivity") is of particular interest both in solids and in liquid fillers, such as propellants, wastewater or chemicals, since this value can constitute a reliable indicator of impurities, the moisture content or the composition of substances. In order to determine the dielectric value, the capacitive measuring principle can be used according to the prior art, especially in the case of liquid bulk materials. In this case, the effect is used that the capacitance of a capacitor changes in proportion to the dielectric value of the medium located between the two electrodes of the capacitor.

Alternatively, it is also possible to determine the dielectric value of a (liquid) medium within a container's interior in a near parasitic manner during its fill level measurement. This requires the measuring principle of the guided radar in which microwaves are guided into the medium via an electrically-conductive waveguide. This combined fill level and dielectricity measurement is described in application document DE 10 2015 117 205 A1.

A further alternative to the capacitive or microwave-based dielectric value measurement consists of inductive measurement. This measuring principle is based on the fact that the resulting impedance of a coil depends not only on its number of windings, the winding material and the material of the coil core, but also on the bulk material, which in each case adjoins the coil and is thus penetrated by the magnetic field of the coil. Accordingly, the dielectric value can be determined by measuring the complex coil impedance.

On the basis of the above-mentioned measurement principles, the dielectric value can be determined very precisely in terms of amount; however, a complex-valued determination is possible only with comparative imprecision. However, the complex-valued determination is of interest in order to be able to characterize the bulk material more closely with regard to its properties or its composition.

SUMMARY

The object of the invention is therefore to provide a measuring device by means of which the dielectric value can also be determined in a complex-valued manner with high accuracy.

The invention achieves this object by means of a measuring device for measuring a dielectric value of a bulk material located in a container. According to the invention, it comprises at least:

A signal generating unit that is designed to
drive a transmitter electrode by means of an electrical AC voltage signal in such a way that the transmitter electrode transmits a radar signal in the direction of the bulk material,
a receiver electrode that is arranged in the container in such a way as to receive the radar signal after passing through the bulk material,
an evaluation unit configured to:
ascertain an amplitude, a phase shift and/or a signal propagation time between the transmitter electrode and the receiver electrode on the basis of the radar signal received by the receiver electrode, and
determine the dielectric value by using the ascertained signal propagation time, phase shift and/or the ascertained amplitude. The real part of the dielectric value can be determined by using the signal propagation time or the phase shift; the imaginary part can be determined by using the measured signal amplitude.

An advantage of the measuring device according to the invention, and of the associated measuring method, is that the dielectric value, even the complex value thereof, can be determined over a large measurement range with a high measurement resolution. Only a limited amount of circuitry is required in this case.

In the context of this invention, the term "radar" is defined generally as a signal or electromagnetic wave having a frequency between 0.03 GHz and 300 GHz. With regard to the measuring device according to the invention, however, it is advantageous if the signal generating unit is designed to generate the AC voltage signal with a frequency between 0.4 GHz and 30 GHz.

Within the context of the invention, the term "unit" is understood to mean in principle any electronic circuit that is designed to be suitable for its intended purpose. Depending on the requirement, it can therefore be an analog circuit for generating or processing corresponding analog signals. However, it can also be a (semiconductor-based) digital circuit, such as an FPGA or a storage medium in interaction with a program. In this case, the program is designed to carry out the corresponding method steps or to apply the necessary calculation operations of the respective unit. In this context, various electronic units of the measuring device in the sense of the invention can potentially also access a common physical memory or be operated by means of the same physical digital circuit.

The measuring device can be operated in a particularly energy-efficient manner if the transmitter electrode and the receiver electrode each comprise at least one dielectric resonator layer and a metallic reflection layer, which is mounted behind the dielectric resonator layer in relation to each other electrode. In this context, it is also advantageous if the dielectric resonator layers are made of a material having a relative dielectric value between 2 and 30. The radar signal can be coupled out or coupled in within a wide range of dielectric values of the bulk material by the resonator layers. In addition, it is advantageous if the material from which the dielectric resonator layer is produced has a magnetic permeability between 0.5 and 10. As a result, the sizes of the transmitting and receiver electrodes can be reduced.

An efficient transmitter electrode or an efficient receiver electrode can be realized, for example, on the basis of a printed circuit board if the transmitter electrode and the receiver electrode each comprise at least one array of planar radiators, which is arranged either on the front side of the dielectric resonator layer or in the interior of the dielectric resonator layer relative to the other electrode. The resonator layer can be formed by the printed circuit board substrate. The metallic reflection layer and the planar radiators can be designed and manufactured analogously to conductor track structuring as optionally structured copper or silver layers. For optimized emission of the radar signal, it is also advantageous in this connection if the dielectric resonator layer or the printed circuit board substrate has a depth that corresponds to one-quarter of the wavelength of the radar signal or a multiple thereof.

The method to be used for determining the signal propagation time of the radar signal is not fixedly predetermined according to the invention. Accordingly, the measuring principle such as the pulse propagation time method, the FMCW method (acronym for "frequency-modulated continuous wave") or a phase evaluation method such as an interferometric method can be used. The measuring principles of FMCW- and pulse radar-based propagation time measuring methods are described, for example, in *"Radar Level Measurement"*; Peter Devine, 2000.

If the measuring device is configured to determine the signal propagation time by means of the FMCW method, the signal generating unit must be designed to generate the AC signal with a varying frequency in such a way that the evaluation unit can determine the signal propagation time by using a difference frequency between the transmitted radar signal and the received radar signal. When implementing the pulse propagation time method, the signal generating unit must be designed to generate the pulsed AC signal in such a way that the evaluation unit can determine the signal propagation time by using a pulse propagation time between the transmitter electrode and the receiver electrode.

Analogously to the measuring device according to the invention, the object underlying the invention is also achieved by a corresponding method, which is for measuring a dielectric value of a bulk material located in a container. Corresponding to the measuring device, it comprises the following method steps:
  emission of a radar signal in the direction of the bulk material,
  reception of the radar signal after passing through the bulk material,
  determination of an amplitude of the received radar signal and/or a signal propagation time between emission and reception of the radar signal, and
  determination of the dielectric value by using the amplitude, the phase shift and/or the signal propagation time.

BRIEF DESCRIPTION OF THE DRAWINGS

The invention is explained in more detail with reference to the following figures. The following is shown.

DETAILED DESCRIPTION

Figure 1:
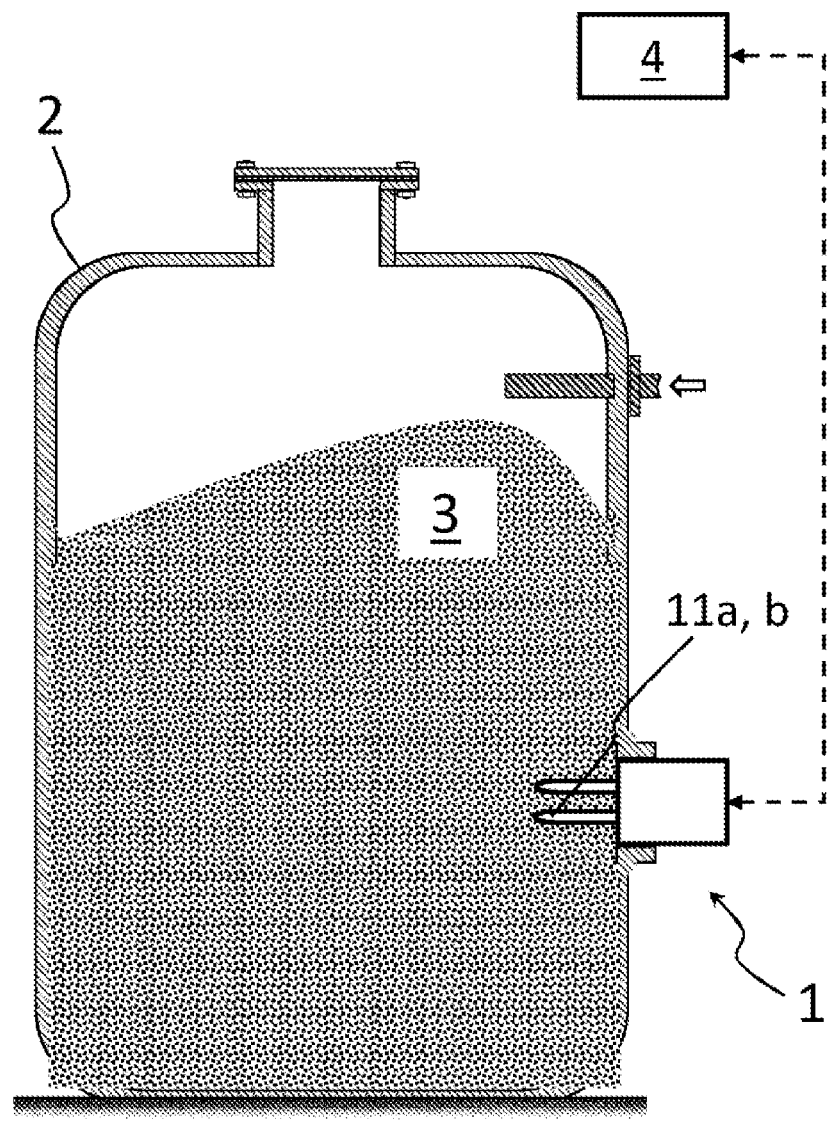
FIG. 1 shows a schematic arrangement of a measuring device according to the present disclosure on a container.

For a general understanding of the measuring device 1 according to the invention, a schematic arrangement of the measuring device 1 on a container 2 is shown in FIG. 1. A bulk material 3, whose dielectric value DC is to be determined, is located in the container. For this purpose, the measuring device 1 is arranged laterally on a connection of the container 2 such as a flange connection. In this case, the measuring device 1 is designed such that two electrodes 11*a*, 11*b* of the measuring device 1 are in contact with the bulk material 3. The electrodes 11*a*, 11*b* are aligned parallel to one another, so that the bulk material 3 is at least partially located between the electrodes 11*a*, 11*b*.

The bulk material 3 can be liquids such as beverages, paints, cement or propellants such as liquid gases or mineral oils. However, the use of the measuring device 1 for bulk goods 3 such as grain or flour is also conceivable. The measuring device 1 can be connected to a superordinate unit 4, for example a process control system. A "PROFIBUS", "HART" or "wireless HART" can for example be implemented as an interface. The dielectric value DC can be transmitted thereby. However, other information about the general operating state of the measuring device 1 can also be communicated.

The basic circuit design of the measuring device 1 is illustrated in greater detail with reference to FIG. 2: As can be seen, one of the electrodes 11*a*, 11*b* functions as a transmitter electrode 11*a* for a radar signal $S_{HF}$ to be emitted. The second electrode 11*b* arranged in parallel serves as a receiver electrode 11*b* for the incoming radar signal $S_{HF}$ after it has penetrated the bulk material 3 between the two electrodes 11*a*, 11*b*. Alternating transmission/reception would also be possible.

In principle, the two electrodes 11*a*, 11*b* are constructed analogously in terms of structure: The core of each electrode 11*a* 11*b* forms a plate-shaped resonator layer 110 consisting of a dielectric material. In order to act as a resonator for the radar signal $S_{HF}$, the material of the resonator layer 110 should preferably be selected such that it has a dielectric value between 2 and 30. In this connection, it is also advantageous if this material has a magnetic permeability between 0.5 and 10 in order to thereby reduce the size. Accordingly, for example,
  ceramics such as $Al_2O_3$,
  (glass fiber reinforced) plastics, such as especially PE, PP and PTFE,
  or metallic glasses such as for example described in the publication US 20160113113 A1,
can be used as potential materials. A metallic reflection layer 111 is preferably applied over the entire rear surface of the resonator layer 110 of the other electrode 11*a*, 11*b* (in relation to each other electrode 11*a*, 11*b*). It serves as a reflector for the radar signal $S_{HF}$, whereby the intensity of the radar signal $S_{HF}$ between the two electrodes 11*a*, 11*b* is increased.

To generate the radar signal $S_{HF}$, a signal generating unit 12 drives the transmitter electrode 11*a* by means of a corresponding AC voltage signal $s_{HF}$. The wavelength of the radar signal $S_{HF}$ is established by the frequency of the AC voltage signal $s_{HF}$. Since the dielectric value DC of the bulk material 3 is determined according to the invention by measuring the amplitude of the received radar signal $S_{HF}$ or by measuring the signal propagation time between the transmitter electrode 11a and the receiver electrode 11b, the receiver electrode 11b is connected to an evaluation unit 13 designed for this purpose. As a result, the evaluation unit 13 correspondingly receives the radar signal $S_{HF}$ arriving at the receiver electrode as an electrical receive signal $e_{HF}$. Since the amplitude is proportional to the imaginary part of the dielectric value DC, the imaginary part can be determined by using the amplitude of the received radar signal $S_{HF}$. This applies analogously to the signal propagation time or the phase shift and the real part of the dielectric value DC.

Since, according to the invention, there is no specification as to which measuring principle is used for determining the signal propagation delay of the radar signal SRF, the evaluation unit 13 and the signal generating unit 12 should be designed depending on the implemented design principle. In this case, each known circuit component can be accessed: In the case of FWCW, the signal generating unit 12 can be constructed based on a PLL ("phase-locked loop"); the evaluation unit 13 can mix the transmitted AC voltage signal $s_{HF}$ with the receive signal $e_{RF}$ by means of a mixer in order to ascertain the propagation time by using the difference frequency of the mixed signal. This can be done, for example, by an FFT ("fast Fourier transform") of the mixed signal $e_{HF}$ by means of a corresponding computing block.

When implementing the pulse propagation method, the signal generating unit 12 for pulse-shaped generation of the AC voltage signal $s_{HF}$ can comprise a correspondingly cyclically controlled oscillator, for example a voltage-controlled oscillator or only a quartz oscillator. The evaluation unit 13 can process the receive signal $e_{HF}$ in a pulse propagation method by undersampling. The evaluation unit 13 can therefore determine the signal propagation time of the corresponding signal maximum by using the sampled and therefore time-extended signal.

Figure 3:
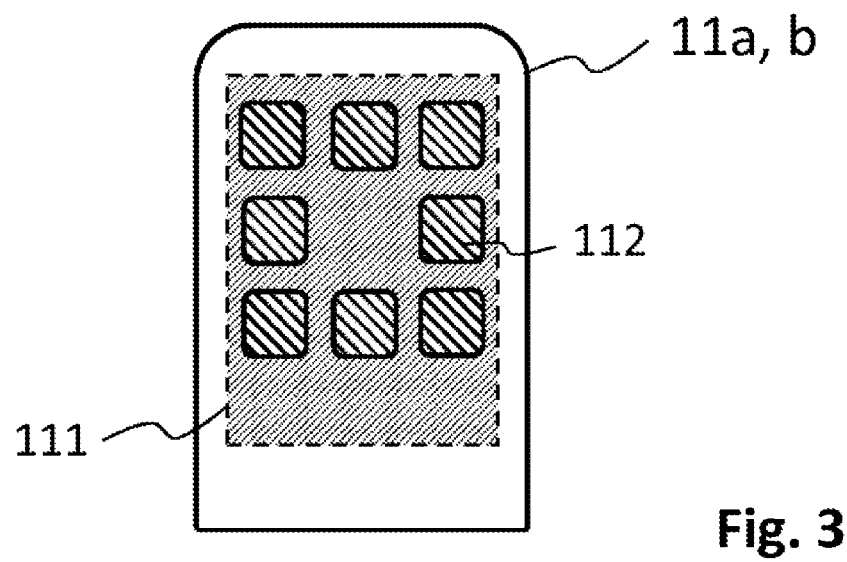
FIG. 3 shows a frontal view of the transmitter electrode and the receiver electrode.

In the shown embodiment version of the transmitter electrode 11a and the receiver electrode 11b, an array 112 of planar radiators is mounted on the front surface of the resonator layer 110 (again in relation to the other electrode 11a, 11b). As can be seen in FIG. 3, the array 112 comprises three times three approximately rectangular patch antennas in the shown embodiment version of the electrodes 11a, 11b; at a frequency between 2 GHz and 30 GHz, the edge length of the patch antennas can be between 0.2 mm and 50 mm. It is generally advantageous if the edge length is significantly less than one-quarter of the wavelength of the radar signal $S_{HF}$, since in this case no electromagnetic far-field is formed.

Electrically, the patch antennas are preferably to be applied to the same potential. For this purpose, the patch antennas can for example be contacted with one another via a distribution network, which is designed as corresponding microstrip lines (not shown). In contrast to the shown embodiment version, the patch antennas could also be realized, for example, as fractal or spiral radiators.

Figure 2:
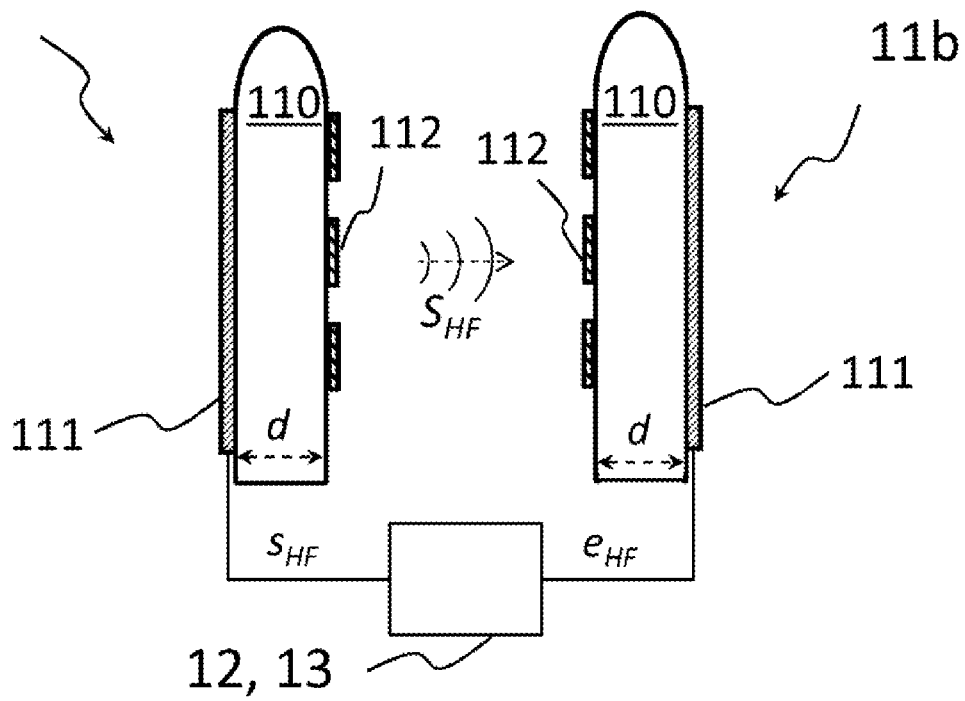
FIG. 2 shows a basic design of the measuring device according to the present disclosure.

The embodiment of the electrodes 11a, 11b shown in FIGS. 2 and 3 is advantageous in that they can be realized on the basis of a printed circuit board. In this case, the dielectric resonator layers 110 may be formed by the printed circuit board substrate. The patch antennas 112 and the rear metallic reflection layers 111 can be realized, for example, as a correspondingly structured copper or silver layer.

In contrast to the shown embodiment, the array 112 of the patch antennas could also be realized as a lower layer within the printed circuit board or within the resonator layer 110 instead of the surface arrangement. In this embodiment, the resonator layer 110 can also be configured in front of the patch antennas 112 (in relation to the emission direction of the radar signal $S_{HF}$) with corresponding recesses. As a result, the emission or the reception of the radar signal $S_{HF}$ is focused further onto the region between the electrodes 11a, 11b.

In the embodiment version of the electrodes 11a, 11b shown in FIG. 2, the signal generating unit 12 for transmitting the AC voltage signal $s_{HF}$ to the transmitter electrode 11a is contacted with its metallic reflection layer 111. The evaluation unit 13 analogously contacts the metallic reflection layer 111 of the receiver electrode 11b. Instead of this form of contacting the electrodes 11a, 11b, it is also possible to contact the signal generating unit 12 or the evaluation unit 13 with the patch antenna array 112, in addition or alternatively to the reflection layers 111. This results in greater transmitting and receiving efficiency.

Figure 4:
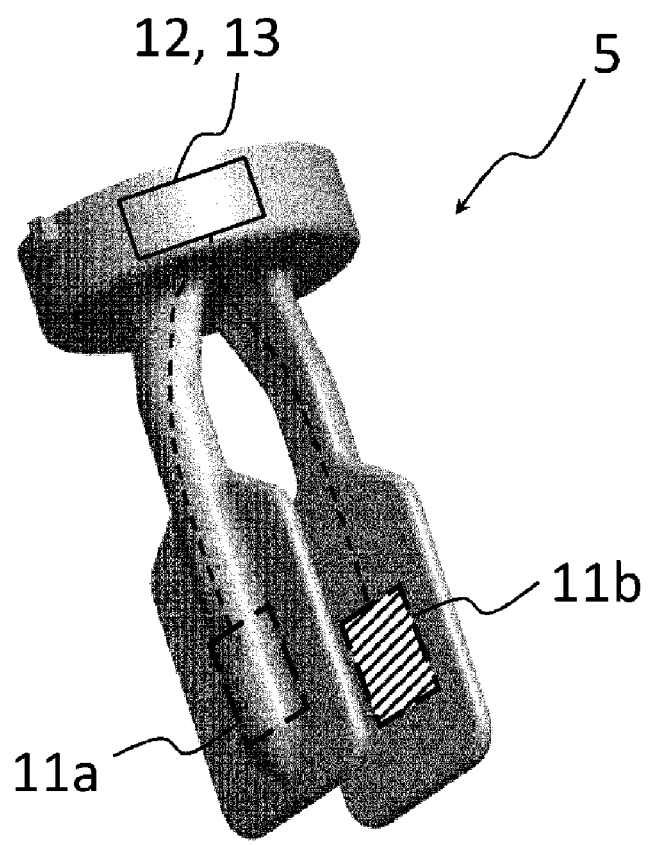
FIG. 4 shows a possible integration of the measuring device into a vibronic limit level detector.

FIG. 4 shows a possible integration of the dielectric value measuring device 1 in a vibronic limit level sensor 5, wherein the shown limit level sensor 5 is based on the two oscillating fork principle. In this case, the transmitter electrode 11a is integrated in one of the two oscillating forks; the receiver electrode 11b is integrated opposite in the second oscillating fork. By integrating the electrodes 11a, 11b or the signal generating unit 12 and the evaluation unit 13, these two measurement principles, limit level measurement and dielectric measurement, can be realized in one and the same measuring device.

The invention claimed is:

1. A measuring device for measuring a dielectric value of a bulk material in a container, comprising:
    a signal generating unit designed to drive a transmitter electrode by means of an electrical AC voltage signal such that the transmitter electrode transmits a radar signal in a direction of the bulk material;
    a receiver electrode arranged in the container to receive the radar signal after passing through the bulk material; and
    an evaluation unit configured to:
        ascertain an amplitude, a phase shift, and/or a signal propagation time between the transmitter electrode and the receiver electrode on the basis of the radar signal received by the receiver electrode, and
        determine the dielectric value on the basis of the ascertained signal propagation time, phase shift, and/or the ascertained amplitude,
    wherein the transmitter electrode and the receiver electrode each includes:
        a dielectric resonator layer, and
        a metallic reflection layer mounted behind the dielectric resonator layer with respect to each other electrode.

2. The measuring device according to claim 1,
    wherein the dielectric resonator layer is made of a material having a relative dielectric value between 2 and 30, and/or
    wherein the material from which the dielectric resonator layer is produced has a magnetic permeability between 0.5 and 10.

3. The measuring device according to claim 1, wherein the transmitter electrode and the receiver electrode each include an array of planar radiators arranged either on the front side on the dielectric resonator layer or in the interior of the dielectric resonator layer relative to the other electrode.

4. The measuring device according to claim 1, wherein the dielectric resonator layer has a depth which corresponds to one-quarter of the wavelength of the radar signal or a multiple thereof.

5. The measuring device according to claim 1, wherein the signal generating unit is designed to generate the AC voltage signal with a varying frequency such that the evaluation unit determines the signal propagation time by using a frequency difference between the emitted radar signal and the received radar signal.

6. The measuring device according to claim 1, wherein the signal generating unit is designed to emit the AC voltage signal in a pulse such that the evaluation unit determines the signal propagation time by using a pulse propagation time between the transmitter electrode and the receiver electrode.

7. The measuring device according to claim 1, wherein signal generating unit is designed to generate the alternating voltage signal with a frequency between 0.4 GHz and 30 GHz.

8. A method for measuring a dielectric value of a bulk material in a container, the method comprising:
   providing a measuring device for measuring the dielectric value of the bulk material in the container, including:
   a signal generating unit designed to drive a transmitter electrode by means of an electrical AC voltage signal such that the transmitter electrode transmits a radar signal in a direction of the bulk material;
   a receiver electrode arranged in the container to receive the radar signal after passing through the bulk material; and
   an evaluation unit configured to:
   ascertain an amplitude, a phase shift, and/or a signal propagation time between the transmitter electrode and the receiver electrode on the basis of the radar signal received by the receiver electrode, and
   determine the dielectric value on the basis of the ascertained signal propagation time, phase shift, and/or the ascertained amplitude,
   wherein the transmitter electrode and the receiver electrode each includes:
   a dielectric resonator layer, and
   a metallic reflection layer mounted behind the dielectric resonator layer with respect to each other electrode;
   emitting the radar signal via the transmitter electrode in the direction of the bulk material;
   receiving the radar signal via the receiver electrode after passing through the bulk material;
   determining the amplitude of the received radar signal and/or the signal propagation time between emission and reception of the radar signal; and
   determining the dielectric value by using the amplitude and/or the signal propagation time.

9. The method according to claim 8, wherein the signal propagation time is determined by using a pulse propagation time method.

10. The method according to claim 8, wherein the signal propagation time is determined by using an FMCW method.

11. The method according to claim 8, wherein the signal propagation time is determined by using a phase evaluation method.

* * * * *